(12) United States Patent  Schultz

(10) Patent No.: US 6,639,331 B2
(45) Date of Patent: Oct. 28, 2003

(54) PARALLEL GENERATOR POWER SYSTEM

(75) Inventor: Mark H. Schultz, Shoreview, MN (US)

(73) Assignee: Onan Corporation, Minneapolis, MN (US)

( * ) Notice: Subject to any disclaimer, the term of this patent is extended or adjusted under 35 U.S.C. 154(b) by 26 days.

(21) Appl. No.: 09/997,481

(22) Filed: Nov. 30, 2001

(65) Prior Publication Data

US 2003/0102716 A1 Jun. 5, 2003

(51) Int. Cl.[7] .................................................. H02J 7/00
(52) U.S. Cl. .............................. 307/84; 307/19; 307/70; 307/153
(58) Field of Search .............................. 307/80, 81, 84, 307/87, 85, 86, 19, 153; 700/9, 11, 12, 297

(56) References Cited

U.S. PATENT DOCUMENTS

| 4,118,635 A | | 10/1978 | Barrett et al. ............. 290/40 R |
| 4,271,465 A | * | 6/1981 | Ohtsuka et al. ............. 710/119 |
| 4,349,744 A | | 9/1982 | Reuther et al. ........... 290/40 C |
| 4,356,402 A | | 10/1982 | Morimoto et al. ............. 307/19 |
| 4,403,292 A | * | 9/1983 | Ejzak et al. ................ 700/297 |
| 4,456,830 A | | 6/1984 | Cronlin ....................... 290/27 |
| 4,937,463 A | | 6/1990 | Kobayashi et al. ........... 307/87 |
| 4,965,463 A | | 10/1990 | Maruyama et al. ........... 307/87 |
| 5,006,781 A | | 4/1991 | Schultz ........................ 322/25 |
| 5,168,208 A | | 12/1992 | Schultz ........................ 322/25 |
| 5,266,838 A | | 11/1993 | Gerner ........................ 307/19 |
| 5,323,328 A | | 6/1994 | Tanaka ....................... 364/492 |
| 5,390,068 A | | 2/1995 | Schultz | |
| 5,497,332 A | | 3/1996 | Allen et al. ................. 364/483 |
| 5,559,376 A | | 9/1996 | Tachikawa ................... 307/86 |
| 5,621,254 A | | 4/1997 | Takeda ........................ 307/64 |
| 5,706,207 A | | 1/1998 | Kurten et al. ............... 364/492 |
| 5,808,378 A | | 9/1998 | O'Leary ....................... 307/87 |
| 5,856,921 A | * | 1/1999 | Kim et al. ..................... 700/3 |
| 6,066,897 A | * | 5/2000 | Nakamura ................. 290/4 A |
| 6,526,467 B1 | * | 2/2003 | Joh ............................. 710/305 |

* cited by examiner

*Primary Examiner*—Brian Sircus
*Assistant Examiner*—Sharon A. Polk
(74) *Attorney, Agent, or Firm*—Schwegman, Lundberg, Woessner & Kluth, P.A.

(57) ABSTRACT

A system for connecting one of a plurality of parallel connected generator sets to a common bus. The system includes a separate module associated with each of the plurality of generator sets. When a control module receives a ready-to-load signal from the generator set, each of the control modules performs a similar connection method which determines which of the modules will send a first-start command to its associated generator.

17 Claims, 5 Drawing Sheets

PARALLEL GENERATOR POWER SYSTEM

FIELD OF THE INVENTION

This invention relates to the field of power generation, and more specifically to a system for choosing between two or more electrical generators when starting a parallel generator power system.

BACKGROUND

Electrical generators or generator sets are devices which transform mechanical energy into electrical energy. A typical generator set includes an engine, driven by a fuel such as gasoline, and a rotating shaft driven by the engine. The rotating shaft develops electric power, which is then used to power an electrical load.

Sometimes, two or more generator sets are connected to a common bus in a parallel arrangement. This allows for each of the generator sets to be turned on as needed. For instance, if a light load is being fed, then only one generator set may be needed. As the load increases, a second generator set, a third generator set, and so on can be activated.

In such parallel generator set systems, a signal is sometimes received by the system to start more than one of the generator sets at a time. However, when two or more generator sets are started simultaneously, it becomes necessary for the system to determine which generator set has started first and allow that generator set to close its circuit breaker to the bus while inhibiting the other generator sets in the system from closing their breakers. This is because the generator sets cannot be simultaneously connected to the bus since their output must be synchronized in voltage, frequency, or phase before being connected to the load. Accordingly, a single generator set must be connected to the load at a time. In the past, a central control module was connected to each generator set to control the generator set connections to the bus. However, such a central controller does not allow a parallel system to be easily expanded and it can be costly to set up and maintain.

What is needed is a system and method for connecting multiple generators to a common load in which there is no central controller so that it is easier to set up a parallel generator power system and easier to add further generators onto the system without having to re-configure the whole system.

SUMMARY

Accordingly, the present invention provides a method and system for connecting multiple generator sets to a shared bus. One aspect of the present system involves a power system. In one embodiment, a power system includes two generator sets and two modules, wherein each of the two modules is associated with one of the two generator sets. Each of the two modules is configured to receive a signal from that module's associated generator set when that module's associated generator set is ready to energize the bus. Each of the two modules also includes an output to send a signal which allows that module's associated generator set to connect to the bus. The modules are connected together and configured so that when each of the modules receives the signal that the module's associated generator set is ready to energize the bus at substantially the same time, each of the two modules performs a method which provides that only one of the two modules is permitted to send the signal which allows that module's associated generator set to energize the bus.

Another aspect of the present system provides a method for connecting one of a plurality of generators to a bus. In one embodiment, a method includes providing a plurality of substantially equivalent connection modules, each of the plurality of connection modules associated with one of the plurality of generator sets, each of the plurality of connection modules configured to send a signal to its associated generator set when the connection module reaches a first-start state. The method further includes connecting each of the plurality of connection modules to its one or two neighboring connection modules to allow the connection modules to communicate with each other.

Among other advantages, the present system allows the power system to be quickly set up and easily expanded by providing separate connection control modules on each generator set instead of having a central controller.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
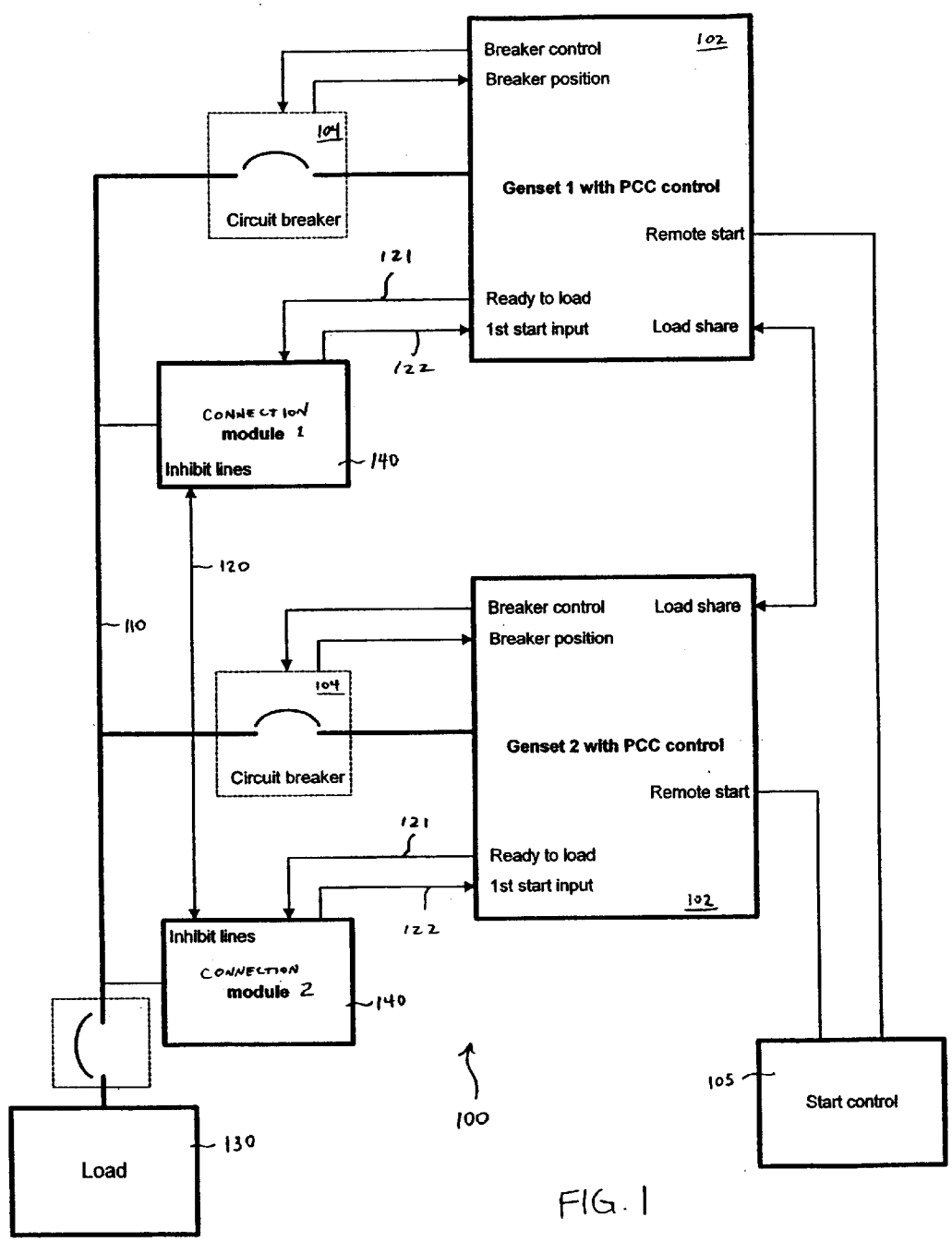
FIG. 1 shows a block diagram of a parallel generator set power system according to one embodiment.

FIG. 1 shows a schematic representation of a power system 100 which includes two or more engine-generator sets 102 connected in parallel to a common bus 110. In this example, generator sets 1 and 2 are shown. The present system is applicable to almost any number of generator sets. In one embodiment, there can be between two and twenty-four generator sets connected together in parallel. Generator sets 102 feed a load 130 via bus 110. A switch 104, such as a circuit breaker, is located between each generator 102 and bus 110. When a given switch 104 is closed, the associated generator set 102 is connected to bus 110 and feeds the load. A start control 105 is connected to each generator set to control the start up of the generator sets.

In one embodiment, each of generator sets 102 are diesel or gas generator sets manufactured by Cummins Power Generation, Inc. In one example use, the system is applicable to diesel generator sets in the 30 Kw to 2 Mw range equipped with hardware which is capable of automatic isolated bus paralleling.

When two or more of the generator sets 102 of system 100 are started simultaneously, it becomes necessary to determine which of the generator sets has started first and allow that generator set to close its associated circuit breaker 104 while inhibiting the other generator sets 102 from closing their circuit breakers. For instance, if generator set #1 is started first, it must be allowed to close its circuit breaker to the bus while generator set #2 is inhibited from closing its circuit breaker. This is because the generator sets cannot be simultaneously connected to the bus since their output must be synchronized in voltage, frequency, or phase before being connected to the load. Once one of the generator sets connects to the bus, the other generator sets recognize that the bus is energized and synchronize and close their breakers accordingly.

To provide this functionality of choosing which generator set should connect to the bus first, system 100 includes two or more connection modules 140. Each connection module 140 is substantially equivalent with the other connection modules 140 and is associated with a separate given generator set 102. For instance, the present system 100 shows connection modules #1 and #2, each of which are associated with generator sets #1 and #2, respectively. Each connection module 140 is connected to its one or two neighboring module(s) 140 by an inhibit line or interconnect line 120. Each connection module 140 controls whether its associated generator set will receive the command to be the first generator set to connect to the bus. Since the connection modules are substantially equivalent, extra connection modules 140 and generator sets 102 can be added on to the system without having to re-configure or reprogram a central control. In one embodiment, connection modules 140 communicate with generator sets 102 via an incoming line 121 which allows the generator set to send a ready-to-load signal to the connection module, and an outgoing line 122 which allows the connection module to send a first-start signal to the generator set.

In this example, when two or more of the generator sets 140 are ready to energize bus 110 simultaneously, the connection modules 140 arbitrate or communicate via interconnect 120 for the right to send the first-start command to their generator set. In other words, the modules 140 as a whole determine which single one of the modules should allow its generator set to connect to the dead bus while inhibiting the other generator sets from connecting to the bus.

In one embodiment, as will be discussed in detail below, this arbitration process takes the form of hardware, electronics, and software in each connection module 140 which is configured so that a module 140 only allows its associated generator set to connect to the bus if the given module reaches a "first-start" state before any other modules. Moreover, as will be understood below, although each connection module 140 is functionally equivalent, only one connection module can reach the "first-start" state during the process.

Among other advantages, having separate, yet functionally equivalent, connection modules 140 associated with each of the generator sets 102 allows parallel power system 100 to be expanded by adding additional generator sets to the system in parallel and connecting the connection modules of each additional generator set in a daisy-chain manner to the connection modules of the previous generator set. There is no central control of the connection procedure so any of the modules can win the arbitrations. This de-centralized control allows for merely adding on new generators sets. No additional configuration needs to be done since each additional module can communicate and arbitrate with the existing modules.

Figure 2:
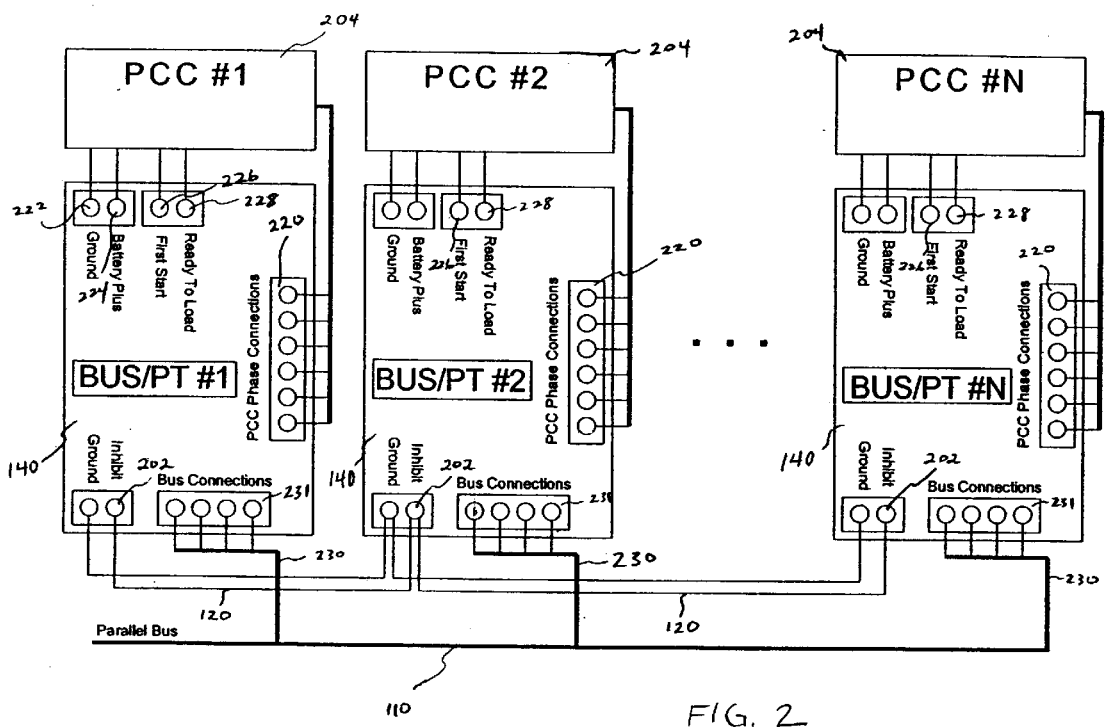
FIG. 2 shows details of the power system of FIG. 1.

FIG. 2 shows further details of one example of connection modules 140. In this example, connection modules 140 are connected in an end-to-end, daisy chain manner. Each connection module 140 includes a two-way I/O 202 which connects each module to neighboring modules via inhibit line interconnect 120.

Each connection module 140 is coupled to a power controller 204 which controls an associated generator set. Accordingly, in this example, the system includes 1, 2, . . . N power controllers 204. In one embodiment, power controllers 204 are PCC (Power Command Control) systems manufactured by Cummins Power Generation, Inc. In one example, each power controller 204 is an integrated generator set control which provides voltage regulation, speed regulation, fault detection, voltage, current and power measurement, digital display and integrates one or more of the functions necessary to provide paralleling, such as synchronizing, load sharing control, and breaker control. One example of such a power controller is described in U.S. Pat. Nos. 5,168,208; 5,390,068; and 5,006,781, each of which are incorporated herein by reference. In some embodiments, some functions of the power controllers are incorporated into the generator set or into the connection module.

Each connection module 140 includes a plurality of phase connector inputs 220 which are coupled to an associated power controller 204. Each module 140 also includes connections to the associated power controller 204 by a ground 222, a battery input 224, a first-start signal output connection 226, and a ready-to-load signal input 228. In one embodiment, the power source for modules 140 is delivered from a battery of the associated generator set to battery input 224.

Ready-to-load signal input 228 receives a "ready-to-load" signal from power controller 204 when the associated generator set is up to its rated speed and voltage and is ready to energize the bus and thus ready to be connected to the bus. If connection module 140 decides (or wins an arbitration with the other connection modules) that its generator set is to be the first to connect to the bus, connection module 140 sends a "first-start" signal via output 210 to the power command member. The associated generator set is then connected to the bus and the other generator sets in the system are inhibited from connecting to the bus.

In one embodiment, each connection module 140 includes a step-down transformer which can be used by the power command member 204 to read the voltage of bus 110. For example, a bus connector 230 can couple connection module 140 to the bus at bus connections 231. One phase of the bus voltage can be used to inhibit operation of the first-start signal from a module 140 to its associated generator set when a bus AC voltage is present.

Figure 3:
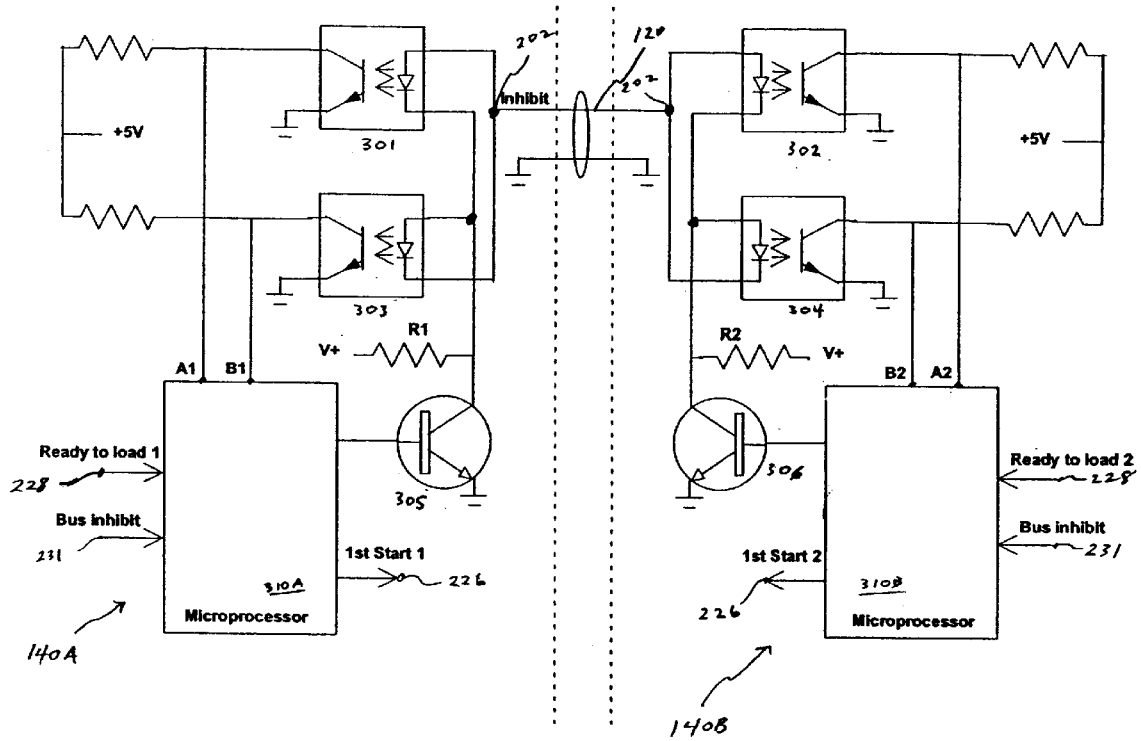
FIG. 3 shows a schematic diagram of electronics and hardware of a starting module of the present system.

FIG. 3 shows a schematic view of one example of the electronics and hardware of a pair of connection modules 140A and 140B. In this example, each connection module 140A and 140B includes a microprocessor 310A and 310, respectively, which receive the ready-to-load signal via inputs 228A and 228B from their respective generator sets and the bus inhibit signal from the bus via bus connection inputs 231A and 231B. The microprocessors 310A and 3101B output a first-start signal to their associated generator set via outputs 226A and 226B if the module wins the arbitration and reaches a "first-start" state, as will be described below. This first-start signal is the signal which tells the associated generator set that it gets to go first and be the first generator to connect to the bus.

In one embodiment, the example connection modules 140A and 140B also include, respectively, a first opto 301 and 302, a second opto 303 and 304, and a transistor 305 and 306. These members are coupled to the two-way inhibit line interconnect 120 and configured to allow connection modules 140A and 140B to communicate or arbitrate with each other via the inhibit line to determine which connection module will be allowed to send the first-start signal via output 226A or 226B.

For instance, in one example, when opto 301 is ON and opto 302 is OFF, then the microprocessor 310A is programmed to know that connection module 140A has activated the inhibit lines and no other modules have activated the inhibit lines. Conversely, when opto 303 is ON and opto 304 is OFF, then the microprocessor 310B is programmed to know that connection module 140B has activated the inhibit lines and no other modules have activated the inhibit lines.

The optos 301–304 are turned OFF and ON depending on the states of the inhibit line interconnect inputs 202 and the transistors 305 and 306. As can be seen in FIG. 3, if transistor 305 is turned ON and transistor 306 is turned OFF, then current flows through line R2 and opto 301 and opto 304 turn ON while optos 302 and 303 remain OFF. Then, as described above, when microprocessor 310A sees opto 301 ON and opto 303 OFF, it knows its module has activated the inhibit lines and no other modules have activated the inhibit lines. The converse is true if transistor 305 is turned OFF and transistor 306 is turned ON. If both transistors 305 and 306 are turned ON, then all the optos 301–304 turn OFF and neither set has control.

Below, Table 1 shows one example implementation of the possible transistor and opto-coupler states and corresponding first-start status for the system shown in FIG. 3.

TABLE 1

Hardware States and Corresponding First Start Status

| Trans. 305 | Trans. 306 | 301 | 303 | Set 140A | 302 | 304 | Set 140B |
|---|---|---|---|---|---|---|---|
| OFF | OFF | OFF | OFF | Disable | OFF | OFF | Disable |
| OFF | ON | OFF | ON | Disable | ON | OFF | Enable |
| ON | OFF | ON | OFF | Enable | OFF | ON | Disable |
| ON | ON | OFF | OFF | Disable | OFF | OFF | Disable |

Referring to FIG. 3 and the table above, in one embodiment each microprocessor 310A and 310B includes an arbitration algorithm to switch its associated transistor 305 or 306 ON and OFF in a random pattern, while the microprocessor observes the states of its associated optos. The arbitration algorithms are designed to insure that only one generator set gets the first-start command.

Figure 4:
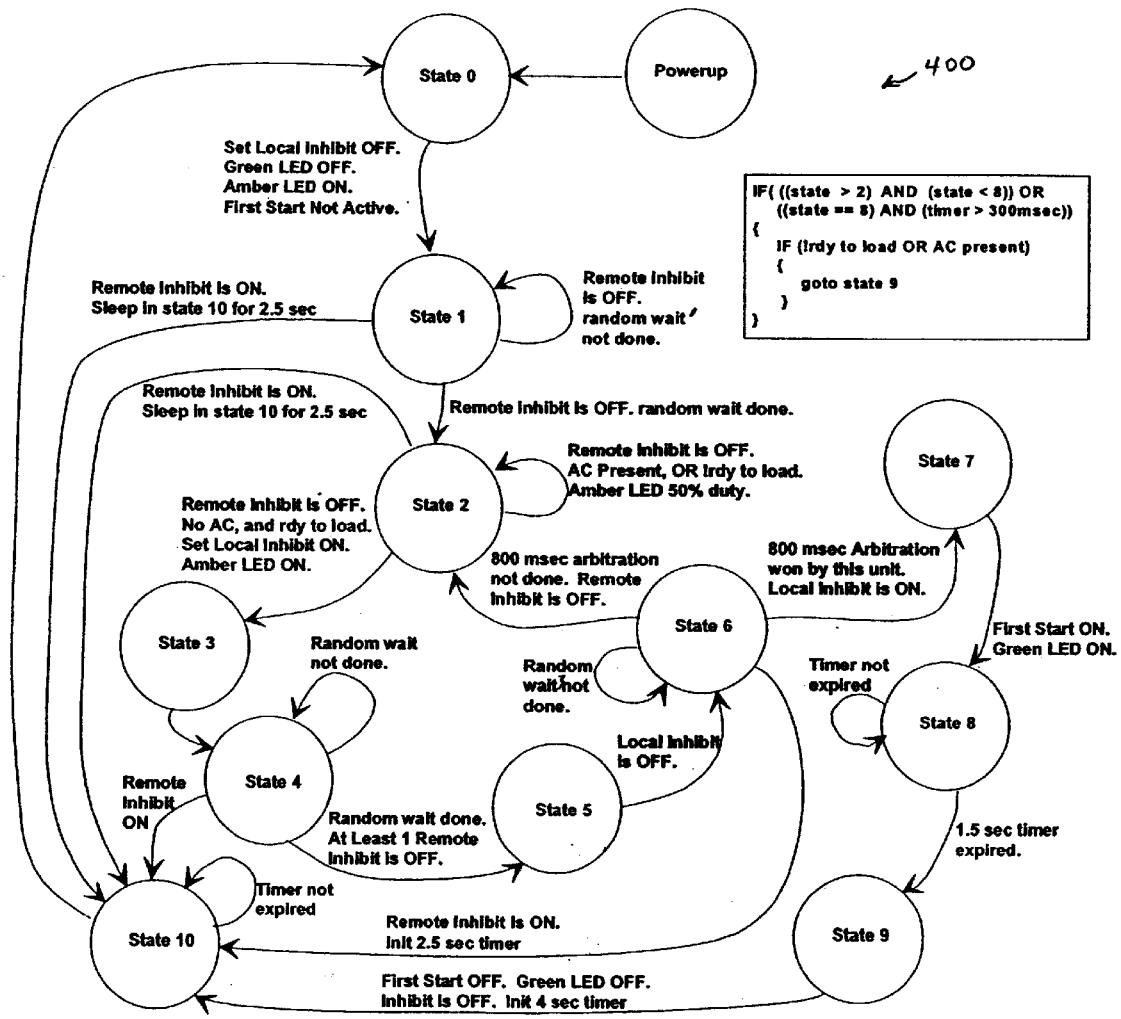
FIG. 4 shows a state diagram of a method in accordance with one embodiment.

FIG. 4 shows a state diagram 400 depicting one example control method according to one embodiment of the present system. The control method will be described in terms of connection module 140A of FIG. 3. Referring to Table 1 will also help understanding of the present description.

The method is first in state 0. The transistor 305 (the local inhibit) is turned OFF and the method goes to state 1. In state 1, the system goes through a random wait period. In one example, the wait period is between 1–4 msec. If the method detects that transistor 306 (the remote inhibit) is ON, the method branches to state 10, then returns to state 0. Alternatively, if the random wait period passes, and transistor 306 remains OFF, then the method goes to state 2.

In state 2, the system waits for a NO AC signal from the bus inhibit input 231 and a ready-to-load signal from the generator set via input 228. If those two conditions are met and transistor 306 remains OFF, then method 400 begins an *arbitration loop which consists of states 2–6. In the present example, the method loops through 100 cycles of states 2–6 with two random waits per cycle. This takes approximately 800 msec. To begin the arbitration loop, the method turns transistor 305 is ON and the method goes to state 3. If transistor 306 remains OFF, the method branches to state 4.

In state 4, a random wait period is done. In this example the random wait is between 1–4 msec. Once the random wait is done, if at least one remote transistor 306 is OFF, the method branches to state 5. If a remote transistor is ON, the method branches to state 10. The local transistor 305 is then turned OFF and the method enters state 6.

In state 6 another random wait is done. If the given module has gone through 100 loops (between states 2–6) and if the remote inhibit is OFF, then the unit knows it has won the arbitration. The local transistor 305 turns ON and the module reaches state 7, leaving the arbitration loop. Alternatively, if the module has not been through 100 loops, it branches to state 2 to try to complete the 100 arbitration loops. If the remote transistor is ON, it has lost the arbitration and it branches to state 10.

From state 7, the method sends a first-start signal to the module's generator via output 226A (or 226B). The method then goes to state 8. If the generator does not switch to the bus within 1.5 seconds, the method goes to state 9, where the first start signal is turned OFF and the local transistor 305 is turned OFF, and the method has the module go to state 10.

In summary, control method 400 turns transistor 305 OFF and ON and observes the state of the opto couplers 301 and 303. When the method has transistor 305 ON and opto 301 is ON and opto 303 is OFF, and the method has completed a required number of arbitration loops, then the method has the right to send a first start signal from a connection module to its generator set. In one example, method 400 turns transistor 305 ON and OFF for random time periods and for a given number of cycles. In one example, the random time periods are 1, 2, 3, or 4 msec.

The method performs the random loops to prevent the modules from turning their transistors ON at exactly the same time which would result in more than one module providing a first start signal. In one example, method 400 loops through arbitration cycles for about 800 msec and there are about 100 arbitration cycles during the 800 msec period. Accordingly, in this example, the probability of more than one first start signal is 1/(random-wait-cyclenumber of cycles)=1/(4100)=1/1.61×10**60. In other examples the number of cycles and the random wait periods can be varied to provide for different probabilities.

Figure 5:
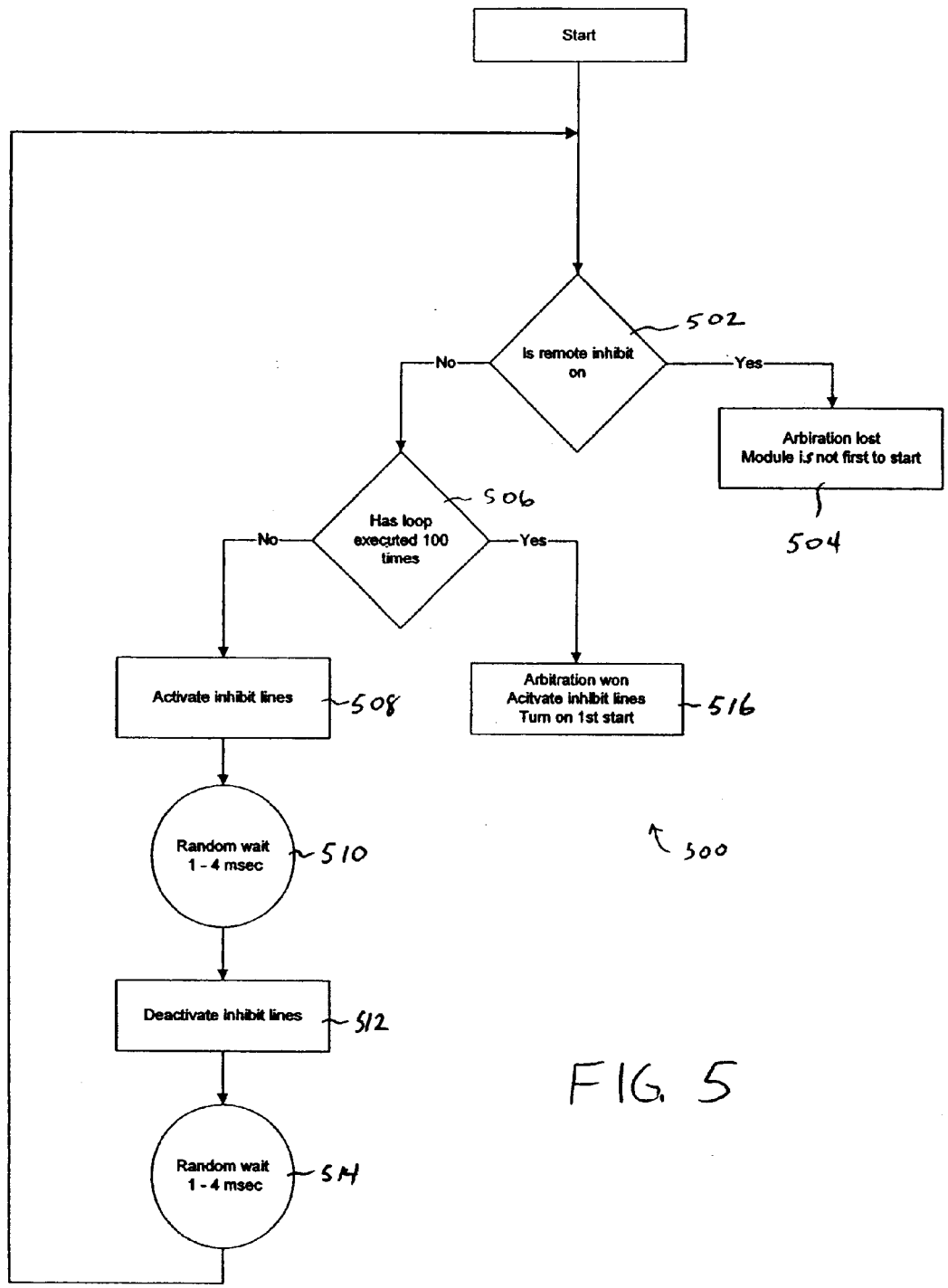
FIG. 5 shows a flowchart depicting an arbitration scheme according to one embodiment.

FIG. 5 shows a flowchart depicting an arbitration scheme 500 according to one embodiment. In general, FIG. 5 depicts what is happening in states 2–6 of method 400 discussed above. In 502, the method inquires whether the remote inhibit is on. If the answer is yes, the method branches to 504, which states that the arbitration is lost. If the remote inhibit is not on in 502, the method branches to 506. In 506, the method inquires whether the loop has executed 100 times. If it has, the given module has won the arbitration and the module sends a first start signal as discussed above. Alternatively, if the loop has not executed 100 times, the method branches to 508, where the local inhibit is activated. In 510, a random wait is done. Then in 512, the local inhibit is turned off, and in 514, another random wait is done, the method then loops back to box 502.

Thus, if a given module sees that a remote inhibit is on and the module has not activated the inhibit lines, then another module is requesting to be the first to start and other modules will drop out of the arbitration. The random waits guarantee that multiple modules will not activate and deactivate the inhibit lines simultaneously and more than one module will think they are the first to start simultaneously. Eventually all modules but one will drop out of the arbitration loop. Advantageously, the connection modules are designed so that if one unit activates the inhibit lines, that module can tell that it alone has activated the lines and that no other modules have activated the lines.

CONCLUSION

Among other advantages, the present system allows the power system to be quickly set up and easily expanded by providing separate connection controls on each generator set instead of having a central controller. Since there is no overall logic, each module has an equivalent chance of winning an arbitration, and there is no pre-determined coordinated connection procedure. This allows additional modules to be connected to the system in a daisy-chain manner without having to perform any detailed configuration.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A power system comprising:
    two generator sets connected in parallel to a common bus, each of the two generator sets having a switch between an output of each of the generator sets and the bus; and
    two modules, wherein each of the two modules is associated with one of the two generator sets and each of the two modules is configured to receive a signal from that module's associated generator set when that module's associated generator set is ready to energize the bus and to output a signal which allows that module's associated generator set to connect to the bus, wherein the two modules are connected to each other;
    wherein the two modules are similarly configured such that when each of the two modules receives the signal that the module's associated generator set is ready to energize the bus at substantially the same time, each of the two modules performs a similar method which provides that only one of the two modules is permitted to send the signal which allows that module's associated generator set to connect to the bus.

2. The power system of claim 1, wherein a result of each of the similar methods performed by each module is not pre-determinable.

3. The power system of claim 1, wherein a result of each of the similar methods performed by each module is randomly decided.

4. The power system of claim 1, wherein each of the two modules includes a randomly controlled transistor and the two modules are connected together such that each module knows whether the transistor of the other module is in an on state or an off state.

5. The power system of claim 4, wherein the method includes each module monitoring a state of its transistor and a state of the other module's transistor and when its transistor is in an on state and the other module's transistor is in an off state, the module is allowed to send the signal which allows that module's associated generator set to connect to the bus.

6. A system for connecting one of a plurality of parallel connected generator sets to a common bus, the system comprising:
    a plurality of separate modules, each of the plurality of separate modules being associated with one of the plurality of generator sets, wherein each separate module is configured to communicate with the other separate modules such that if more than one of the plurality of generator sets is ready to energize the common bus, each of the separate modules associated with the more than one generator sets communicate with each other to randomly decide which generator set will be allowed to connect to the common bus first.

7. The system of claim 6, wherein each of the plurality of separate modules includes a randomly controlled transistor and each of the plurality of separate modules knows whether the transistor of the other separate modules is in an on or off state.

8. The power system of claim 7, wherein each of the plurality of separate modules monitors a state of its transistor and a state of the other separate modules transistors and when its transistor is in an on state and the other separate modules transistors are in an off state, that module is allowed to send a signal which allows that module's associated generator set to connect to the bus.

9. A module connected to a generator for controlling a connection of the generator to a bus, the module comprising:
    an input for receiving a signal indicating that the generator is ready to energize the bus;
    an output for sending a signal allowing the generator to connect to the bus;
    a second input for connecting the module to a second module which is connected to a second generator; and
    a signal processor which is configured to monitor the second input and to send the signal allowing the generator to connect to the bus when the signal processor reaches a first-start state before the second module.

10. The module of claim 9, wherein the module includes a first transistor which is turned off and on by the signal processor for random time periods, and wherein the signal processor monitors the second input by sensing whether a second transistor in the second module is in an on state, wherein when the first transistor is in an on state and the second transistor is in an off state, the module sends the signal allowing the generator to connect to the bus.

11. The module of claim 9, wherein the module includes a first opto coupler, a second opto coupler, and a transistor, which are connected to the signal processor and to the second input and are configures so that when the transistor is ON, the first opto coupler is ON and the second opto coupler is OFF, the signal processor sends the signal allowing the generator to connect to the bus.

12. The module of claim 9, wherein the module and the second module have substantially equivalent configurations such that it is not pre-determinable which module will reach the first-start state first.

13. A method of connecting one of a plurality of parallel connected generator sets to a common bus, the method comprising:
    providing a plurality of substantially functionally equivalent connection modules, each of the plurality of connection modules associated with one of the plurality of generator sets, each of the plurality of connection modules configured to send a signal to its associated generator set when the connection module reaches a first-start state; and connecting each of the plurality of connection modules to the connection module's one or two neighboring connection modules to allow the connection modules to communicate with each other.

14. The method of claim 13, wherein when two or more of the plurality of connection modules receive a signal that their associated generator sets are ready to energize the bus at substantially the same time, the connection modules perform similar methods to determine which connection module will be allowed to send the signal to its associated generator set.

15. The method of claim 14, wherein a result of the methods of the two modules is not pre-determinable.

16. The method of claim 14, wherein a result of the methods of the two modules is randomly decided.

17. A method of connecting one of a plurality of parallel connected generator sets to a common bus, the method comprising:
   providing a plurality of substantially equivalent modules, wherein each of the plurality of modules is associated with one of the plurality of parallel connected generator sets;
   determining which one of the plurality of substantially equivalent modules reaches a first-start state;
   directing the one module which reaches the first-start state to send a signal to its associated generator set to allow the generator set to load to the bus; and
   inhibiting the rest of the plurality of modules from sending a signal to their associated generator sets.

* * * * *